United States Patent [19]

Yuasa et al.

[11] Patent Number: 5,034,289
[45] Date of Patent: Jul. 23, 1991

[54] ALKALINE STORAGE BATTERY AND METHOD OF PRODUCING NEGATIVE ELECTRODE THEREOF

[75] Inventors: Kohji Yuasa, Moriguchi; Munehisa Ikoma, Katano; Hiroshi Kawano, Ibaraki; Osamu Takahashi, Fujisawa; Isao Matsumoto, Osaka, all of Japan

[73] Assignee: Matsushita Electric Industrial Co., Ltd., Osaka, Japan

[21] Appl. No.: 356,246

[22] Filed: May 24, 1989

[30] Foreign Application Priority Data

Feb. 23, 1989 [JP] Japan ................................ 1-43709

[51] Int. Cl.$^5$ .......................................... H01M 10/24
[52] U.S. Cl. ...................................... 429/59; 429/206; 429/212; 429/218
[58] Field of Search ................ 429/206, 218, 212, 42, 429/44, 57, 59; 420/900; 252/182.1

[56] References Cited

U.S. PATENT DOCUMENTS

| | | |
|---|---|---|
| 3,850,694 | 11/1974 | Dunlop et al. ................... 429/27 X |
| 4,214,043 | 7/1980 | van Deutekom ................... 429/27 |
| 4,312,928 | 1/1982 | Van Deutekom ................... 429/27 |
| 4,487,817 | 12/1984 | Willems et al. ................... 429/27 |
| 4,636,445 | 1/1987 | Yamano et al. ................... 429/53 |
| 4,702,978 | 10/1987 | Heuts et al. ...................... 429/218 |
| 4,752,546 | 6/1988 | Heuts et al. ...................... 429/218 |
| 4,826,744 | 5/1989 | Itou et al. ........................ 429/206 |
| 4,837,119 | 6/1989 | Ikoma et al. ...................... 429/206 |

FOREIGN PATENT DOCUMENTS

| | | |
|---|---|---|
| 0271043 | 6/1988 | European Pat. Off. |
| 2382774 | 9/1978 | France |
| 58-46830 | 10/1983 | Japan |
| 59-37667 | 3/1984 | Japan |
| 60-109183 | 6/1985 | Japan |
| 60-212958 | 10/1985 | Japan |
| 60-220556 | 11/1985 | Japan |
| 61-64068 | 4/1986 | Japan |
| 61-151967 | 7/1986 | Japan |
| 62-139255 | 6/1987 | Japan |
| 63-195960 | 8/1988 | Japan |
| 63-304570 | 12/1988 | Japan |

OTHER PUBLICATIONS

Chemical Abstracts, Abstract No. 158314t, vol. 107, No. 18, p. 249, Nov. 2, 1987, Columbus, Ohio.
Chemical Abstracts, Abstract No. 234219z, vol. 109, No. 26, p. 193, Dec. 26, 1988, Columbus, Ohio.
Chemical Abstracts, Abstract No. 152446d, vol. 104, No. 18, p. 209, May 5, 1986, Columbus, Ohio.
Chemical Abstracts, Abstract No. 144853v, vol. 103, No. 18, p. 172, Nov. 4, 1985, Columbus, Ohio.
Chemical Abstracts, Abstract No. 113952j, vol. 101, No. 14, p. 170, Oct. 1, 1984, Columbus, Ohio.
Chemical Abstracts, Abstract No. 27171e, vol. 105, No. 4, p. 181, Jul. 28, 1986, Columbus, Ohio.
Patent Abstracts of Japan, vol. 10, No. 352 (E-458) [2408], Nov. 27, 1986.
Patent Abstracts of Japan, vol. 10, No. 61 (E-387) [2118], Mar. 11, 1986.
Chemical Abstracts, Abstract No. 142237q, vol. 100, No. 18, p. 182, Apr. 30, 1984, Columbus, Ohio.

Primary Examiner—Anthony Skapars
Attorney, Agent, or Firm—Stevens, Davis, Miller & Mosher

[57] ABSTRACT

Disclosed is an improvement in a negative electrode of an alkaline storage battery, in which the negative electrode is constituted by a hydrogen absorbing alloy capable of absorbing/desorbing hydrogen electrochemically, and a hydrophobic material and a hydrophilic material are provided in a portion of the surface layer of the negative electrode and in the side of the negative electrode respectively so as to properly secure both the wetting property and hydrophobic property of the negative electrode against the alkaline electrolytic solution. Accordingly, a hydrogen can be absorbed electrochemically in the portion of the negative electrode which is wetted by the electrolytic solution and a hydrogen gas generated in charging the battery can be absorbed by a vapor phase reaction in the hydrophobic portion of the negative electrode which is exposed to the vapor phase so that the internal gas pressure can be reduced to thereby make it possible to perform rapid charging.

2 Claims, 5 Drawing Sheets

1 — NEGATIVE ELECTRODE
2 — NICKEL POSITIVE ELECTRODE
3 — SEPARATOR
4 — CASE
5 — POSITIVE ELECTRODE CAP
6 — SAFETY VENT
7 — SEALING PLATE
8 — INSULATING GASKET
9 — POSITIVE ELECTRODE COLLECTOR

1 ---- NEGATIVE ELECTRODE
2 --- NICKEL POSITIVE ELECTRODE
3 --- SEPARATOR
4 --- CASE
5 --- POSITIVE ELECTRODE CAP
6 --- SAFETY VENT
7 --- SEALING PLATE
8 --- INSULATING GASKET
9 --- POSITIVE ELECTRODE COLLECTOR

ALKALINE STORAGE BATTERY AND METHOD OF PRODUCING NEGATIVE ELECTRODE THEREOF

BACKGROUND OF THE INVENTION

The present invention relates to an alkaline storage battery using a negative electrode of a hydrogen absorbing alloy, and an improvement in a method of producing the negative electrode.

Recently, hydrogen absorbing alloys capable of electro-chemically absorbing/desorbing a great deal of hydrogen serving as an active material have attracted attention as an of high energy density electrode material of high energy density and have been intended to be applied to a sealed alkaline storage battery to be developed into a high capacity storage battery, in particular, to be applied to a sealed nickel-hydrogen storage battery.

The electrode reaction in such a sealed nickel-hydrogen storage battery is as follows.

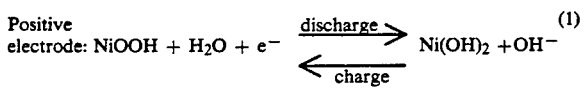
(1)

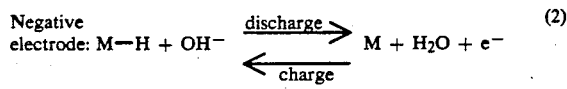
(2)

In the reaction equation (2), M represents a hydrogen absorbing alloy.

A hydrogen absorbing alloy negative electrode for use in this type storage battery is prepared through a process in which an alkali-resisting organic high molecule, such as polyethylene, fluorine resin, or the like, is added as a binding agent to a pulverized hydrogen absorbing alloy, and the resulting mixture is pressed onto or filled into an electrically conductive collector such as a perforated metal or a foamed metal.

When the battery is overcharged, gas generation reactions represented by the following equations (3) and (4) occur on the positive electrode and the negative electrode of the battery, respectively.

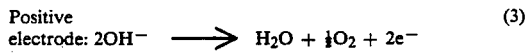
(3)

(4)

To suppress the increase of the internal gas pressure of the battery, a method in which an oxygen gas generated from the positive electrode according to the equation (3) is made to react with hydrogen absorbed in the negative electrode to thereby generate water has been employed. To suppress the generation of a hydrogen gas according to the equation (4), a method in which the capacity of the negative electrode is established to be larger than the capacity of the positive electrode has been employed.

When the battery is charged rapidly, however, the rate of generation of an oxygen gas is often larger than the rate of absorption of the same gas so that the oxygen gas is accumulated in the battery to thereby increase the internal gas pressure of the battery. To eliminate the aforementioned disadvantage, a method of accelerating reduction of an oxygen gas by adding a noble metal catalyst such as platinum to the negative electrode (as disclosed in Japanese Patent Unexamined Publication No. 60-100382), a method of accelerating absorption of an oxygen gas onto the negative electrode by providing a hydrophobic layer in the hydrogen absorbing alloy negative electrode (as disclosed in Japanese Patent Unexamined Publication No. 61-118963), and the like, are known.

However, various problems arise in the aforementioned, conventional construction of the battery as follows. The method of adding a noble metal to the negative electrode has a problem in that the material cost is increased. On the other hand, the method of providing a hydrophobic layer in the negative electrode has a problem in that the discharging voltage is dropped because of the uneven electrolyte distribution of the negative electrode and the decrease of the effective surface area for the electrochemical reaction. Further, the aforementioned method is effective to improve the oxygen absorption capacity of the negative electrode but has another problem in that the inner pressure of the battery is increased because hydrogen is apt to be generated from the negative electrode in charging the battery with lowering of the wetting property for the electrolytic solution, of the inside of the hydrogen absorbing alloy negative electrode. In particular, this fact is remarkable when the battery is charged rapidly.

OBJECTS AND SUMMARY OF THE INVENTION

An object of the present invention is therefore to solve the aforementioned problems.

That is to say the object of the invention is to provide a hydrogen absorbing alloy negative electrode of a battery, in which wetting property of the inside of the negative electrode against an electrolytic solution can be improved while hydrophobic property of the surface of the negative electrode can be kept suitably, by which not only the internal gas pressure of the battery can be reduced in charging the battery rapidly but also voltage drop can be prevented in discharging the battery.

To solve the aforementioned problems, the present invention provides a construction of an alkaline storage battery in which a hydrophilic resin is provided to the inside of a negative electrode formed of a hydrogen absorbing alloy, and a hydrophobic resin is provided to the surface portion of the negative electrode, and also a method of producing the negative electrode of the above construction.

In the construction and the producing method, according to the present invention, a hydrogen gas is absorbed into the hydrogen absorbing alloy by providing the hydrophobic resin to the surface of the hydrogen absorbing alloy negative electrode. Further, the wetting property of the inside of the hydrogen absorbing alloy negative electrode against an electrolytic solution is improved by use of the hydrophilic resin to make it capable of easily absorbing hydrogen electrically, so that generation of a hydrogen gas can be prevented to thereby reduce the internal gas pressure of the battery in charging the battery rapidly. Further, the voltage drop in discharging the battery can be prevented by addition of the hydrophilic resin.

DETAILED DESCRIPTION OF THE INVENTION

Figure 1:
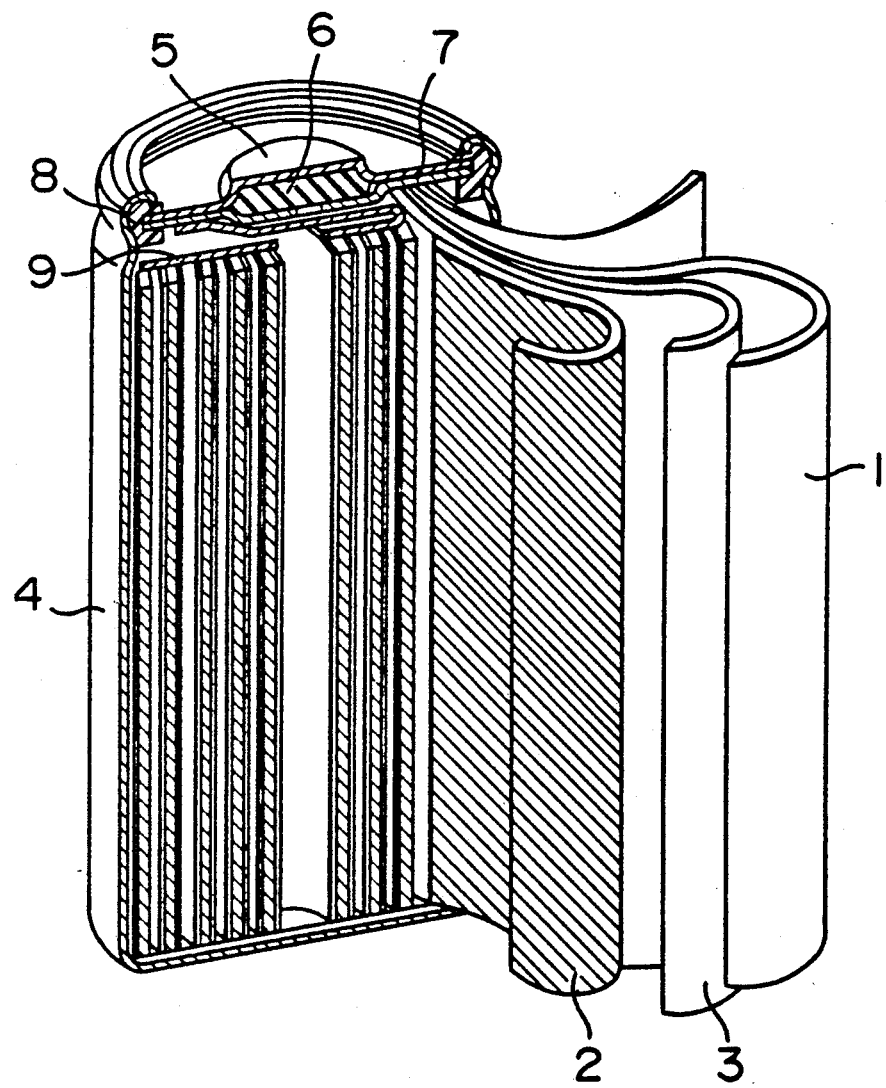
FIG. 1 is a sectional view of a nickel-hydrogen storage battery produced according to the present invention.

The present invention will be described hereunder with respect to various examples. In the examples, the hydrogen absorbing alloy used for the negative electrode was $MmNi_{3.55}Co_{0.75}Mn_{0.4}Al_{0.3}$. Misch metal Mm (La: about 25 wt. %, Ce: about 52 wt. %, Nd: about 18 wt. %, Pr: about 5 wt. %) which was a mixture of rare-earth elements was put into an arc furnace together with other metal samples of Ni, Co, Mn and Al. The furnace was evacuated to obtain a vacuum state of from $10^{-4}$ to $10^{-4}$ Torr. Then the metal samples were heated and melted by arc discharging under reduced pressure in an atmosphere of argon gas. Heat treatment was carried out at 1050° C. for 6 hours in a vacuum to homogenize the metal samples. The thus obtained alloy was ground roughly and then pulverized by a ball mill to prepare fine powder having a particle size of not larger than 38 μm.

By use of the thus prepared hydrogen absorbing alloy powder, the following, 20 kinds of hydrogen absorbing alloy negative electrodes were prepared.

EXAMPLE 1

An aqueous solution of polyvinyl alcohol (hereinafter referred to as "PVA") which was a hydrophilic resin was mixed, by an amount of PVA of 0.15 wt. %, into the hydrogen absorbing alloy powder to form paste. A foamed nickel matrix having a porosity of 95% was filled with the paste and pressed. Then resin powder of a copolymer of ethylene tetrafluoride and propylene hexafluoride (hereinafter referred to as "FEP") was applied, by an amount of 0.8 mg/cm², onto the both surfaces of the negative electrode.

EXAMPLE 2

Water was added to the aforementioned hydrogen absorbing alloy powder to form paste. A foamed nickel matrix having a porosity of 95% was filled with the paste and pressed. Then "FEP" was applied, by an amount of 0.8 mg/cm², onto the surfaces of the negative electrode. Thus, a hydrogen absorbing alloy negative electrode in which such a hydrophobic resin was disposed on the surfaces of the negative electrode with no hydrophilic resin disposed in the inside thereof was obtained.

EXAMPLE 3

Ethyl alcohol was added to a mixture of 97 wt. % hydrogen absorbing alloy powder and 3 wt. % FEP to form paste. A foamed nickel matrix having a porosity of 95% was filled with the paste and pressed. Thus, a hydrogen absorbing alloy electrode having the hydrophobic resin in the inside was prepared. There were respectively cut into AA battery size (39 mm × 80 mm × 0.5 mm) to prepare negative electrode plates having a charge/discharge capacity of 1600 mAh and a porosity of 30 vol. %.

Examples 4 to 20 show the cases where negative electrodes are prepared in the same manner as the Example 1, unless otherwise specified.

EXAMPLE 4

A hydrogen absorbing alloy negative electrode constituted by the aforementioned hydrogen absorbing alloy having a mean particle diameter of 0.1 μm was prepared.

EXAMPLE 5

A hydrogen absorbing alloy negative electrode constituted by the aforementioned hydrogen absorbing alloy having a mean particle diameter of 75 μm was prepared.

EXAMPLE 6

A hydrogen absorbing alloy negative electrode formed by dipping the hydrogen absorbing alloy powder into an alkaline solution to thereby roughen the surfaces of the hydrogen absorbing alloy particles was prepared.

EXAMPLE 7

A hydrogen absorbing alloy negative electrode coated with polyethylene as a hydrophobic resin was prepared.

EXAMPLE 8

A hydrogen absorbing alloy negative electrode coated with ethylene tetrafluoride (hereinafter referred to as "M-12") having a permeability coefficient of $1 \times 10^{-9}$ cm/sec.atm for an oxygen/hydrogen gas was prepared.

EXAMPLE 9

A hydrogen absorbing alloy negative electrode coated with a hydrophobic resin by dipping the alloy powder into a solution of an FEP dispersion (hereinafter referred to as "ND-1") containing a surface active agent was prepared.

EXAMPLE 10

A hydrogen absorbing alloy negative electrode coated with polyvinylidene fluoride (hereinafter referred to as "VDF") powder as a hydrophobic resin was prepared.

EXAMPLE 11

A hydrogen absorbing alloy negative electrode coated with FEP by an amount of 0.1 mg/cm$^2$ was prepared.

EXAMPLE 12

A hydrogen absorbing alloy negative electrode coated with FEP by an amount of 2 mg/cm$^2$ was prepared.

EXAMPLE 13

A hydrogen absorbing alloy negative electrode coated with a 2:1 (weight proportion) mixture of platinum black capable of catalyzing the decomposition of hydrogen and FEP, by an amount of 2.4 mg/cm$^2$, was prepared.

EXAMPLE 14

A hydrogen absorbing alloy negative electrode coated with platinum black by an amount of 1.6 mg/cm$^2$ and then coated with FEP by an amount of 0.8 mg/cm$^2$, was prepared.

EXAMPLE 15

A hydrogen absorbing alloy negative electrode coated with a 4:1 (weight proportion) mixture of LaNi$_4$Al and FEP by an amount of 4.0 mg/cm$^2$, was prepared.

EXAMPLE 16

A hydrogen absorbing alloy negative electrode coated with a 1:1 (weight proportion) mixture of acetylene black as an electric conductive material and FEP, by an amount of 1.6 mg/cm$^2$, was prepared.

EXAMPLE 17

A hydrogen absorbing alloy negative electrode containing a hydrophilic resin by an amount of 1.5 wt. % in the inside of the electrode, was prepared.

EXAMPLE 18

A hydrogen absorbing alloy negative electrode formed of an electrode plate having a porosity of 15 vol. % was prepared.

EXAMPLE 19

A hydrogen absorbing alloy negative electrode prepared by the steps of: filling a foamed nickel matrix with paste constituting of mixture of the hydrogen absorbing alloy powder and PVA by an amount of 0.15% by weight of the alloy powder; applying FEP on the surface of the foamed nickel matrix; and pressing the formed nickel matrix to obtain a predetermined thickness, was prepared.

EXAMPLE 20

A hydrogen absorbing alloy negative electrode coated with FEP by an amount of 0.8 mg/cm$^2$ by dipping a negative electrode plate into a dispersion solution prepared by dispersing FEP powder into an aqueous solution of 1.5 wt. % PVA, was prepared.

A negative electrode 1 selected from those twenty kinds of negative electrodes and a nickel positive electrode 2 prepared by filling a known foamed nickel matrix with nickel hydroxide were inserted into a case 4 acting as a negative electrode terminal while the negative electrode 1 and the positive electrode 2 were wound spirally through a separator 3 formed of polyamide non-woven fabric. Then an alkaline electrolytic solution in a predetermined amount was injected into the case 4 and sealed to prepare a sealed nickel-hydrogen storage battery of 1000 mAh in AA size. The structure of the thus prepared battery is shown in FIG. 1, in which a safety vent 6 provided in the inner side of a positive electrode cap 5 is set so as to be actuated by pressure of not lower than 30 kg/cm$^2$ for the purpose of measuring the internal gas pressure of the battery, though, in general, such a safety vent 6 is often set so as to be actuated by pressure of 11 to 12 kg/cm$^2$. In the drawing, the reference numeral 7 designates a sealing plate, 8 designates an insulating gasket, and 9 designates a positive electrode collector for electrically connecting the positive electrode 2 to the sealing plate 7. The battery having a 1 mmΦ through hole formed in the bottom portion of the battery case was fixed on a fixing apparatus and the internal gas pressure of the battery was measured with a pressure sensor attached to the fixing apparatus. In the measurement of the internal gas pressure of the battery,m charging was carried out at each of various charging rates in a range of not larger tan 2 CmA until the battery had been charged to 200% of the positive electrode capacity, and the internal gas pressure of the battery measured at that time was defined as the battery internal gas pressure at that charging rate. On the other hand, a gas generated in the battery were collected by an aquatic substitution method and the gas composition was analyzed by means of gas chromatography.

In a test of discharging characteristic, the battery was charged to 150% of the positive electrode capacity with a charging current of 1 CmA in a circumstance of 20° C., and then continuously discharged to 0.8 V with a discharging current of 3 CmA.

Figure 2:
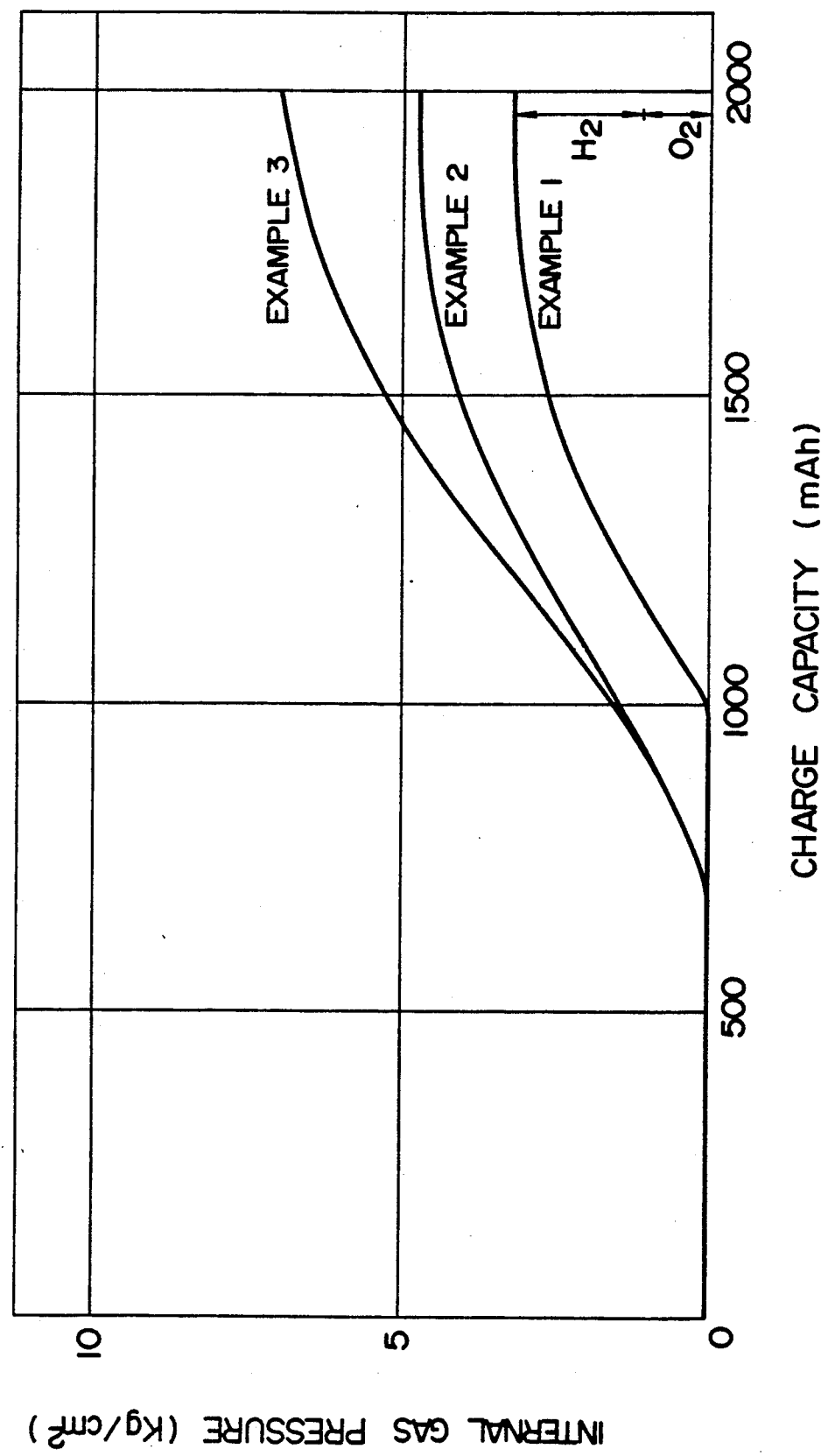
FIG. 2 is a graph view showing the relation between charge electric capacity and internal gas pressure in the case where a charging current of 1 CmA at 20° C. is respectively supplied to various hydrogen absorbing alloy negative electrodes different in construction.

FIG. 2 shows the change of the internal gas pressure of the battery relative to the charged capacity in the case where each of the batteries respectively including the hydrogen absorbing alloy negative electrodes of the Examples 1, 2 and 3 was charged to 200% of the positive electrode capacity with a charging current of 1 CmA. As shown in FIG. 2, the internal gas pressure of the battery upon completion of charging to 2000 mAh was 3.3 kg/cm$^2$ in the case of the Example 1, 4.8 kg/cm$^2$ in the case of the Example 2, and 7.0 kg/cm$^2$ in the case of the Example 3. In the case of the Example 1, the increase of the internal gas pressure of the battery was started from the time when the battery had been charged to about 1000 mAh. In the cases of the Examples 2 and 3, the increase of the internal gas pressure of the battery was started when the battery had been charged to about 800 mAh. Through analyzing the gas composition generated in the battery upon completion of charging to 2000 mAh, the oxygen partial pressure was measured to be about 1 kg/cm$^2$ substantially equally in the all cases of the Examples 1 to 3. Accordingly, it was understood that the differences in the internal gas pressure of the battery among the three kinds of batteries were caused by differences in hydrogen partial pressure.

The reason is as follows.

In the nickel-hydrogen storage battery designed to have a high-capacity, for example, of 100 mAh in AA size, as shown in the present experiment, the balance of the negative electrode capacity (1600 mAh) against the positive electrode capacity (100 mAh) is not so sufficient that a reaction represented by the following equations (5) to (8) progresses on the hydrogen absorbing alloy negative electrode in charging the battery.

$$M + H_2O + e^- \rightarrow MH + OH^- \quad (5)$$

$$H_2O + e^- \rightarrow \tfrac{1}{2} H_2 + OH^- \quad (6)$$

$$M + \tfrac{1}{2} H_2 \rightarrow MH \quad (7)$$

$$MH + \tfrac{1}{4} O_2 \rightarrow M + \tfrac{1}{2} H_2O \quad (8)$$

In the equations, M represents a hydrogen absorbing alloy. In short, the hydrogen absorbing reaction represented by the equation (5) and the hydrogen generation reaction represented by the equation (6) occur competitively in a portion of the negative electrode wetted by the electrolytic solution. Further, the reaction of consumption of an oxygen gas generated from the positive electrode, represented by the equation (8), occurs in the wetted portion at the same time. On the contrary, the hydrogen gas absorbing reaction (7), which hydrogen gas was generated according to the equation (6), progresses in another portion of the negative electrode which is not wetted by the electrolytic solution. The hydrophobic resin FEP acts to control the area of the hydrophobic portion on the hydrogen absorbing alloy negative electrode. It is apparent from the results of the Examples 2 and 3 that addition of the hydrophobic resin to the surface of the negative electrode is more effective than addition thereof to the inside of the negative electrode, and that the erection of the equation (7) occurs mainly on the surface of the negative electrode. Comparing those examples, the Examples 2 and 3 are inferior in wetting property of the hydrogen absorbing alloy negative electrode for the electrolytic solution because of the addition of the hydrophobic resin. Accordingly, in the Examples 2 and 3, the defective surface area in the electrochemical reaction decreases, so that the charging current density increase to accelerate the hydrogen gas generation reaction of the equation (6) to make the rising of the internal gas pressure of the battery early and to increase the internal gas pressure rapidly. To solve this problem, PVA, which is a hydrophilic resin, was added to the inside of the electrode in the Example 1. As the result, the wetting property of the inside of the hydrogen absorbing alloy negative electrode particularly for the electrolytic solution was improved. As compared with the Examples 2 and 3, the Example 1 had an advantage in the point as follows. The charging current density was reduced by the increase of the effective surface area in the electrochemical reaction, so that the hydrogen gas generation reaction of the equation (6) was suppressed to delay the rising of the internal gas pressure of the battery to thereby reduce the internal gas pressure of the battery. For the aforementioned reason, in the Example 1 the increase of the internal gas pressure of the battery can be suppressed even in the case were the battery is charged rapidly with a charging current of 1 CmA.

Figure 3:
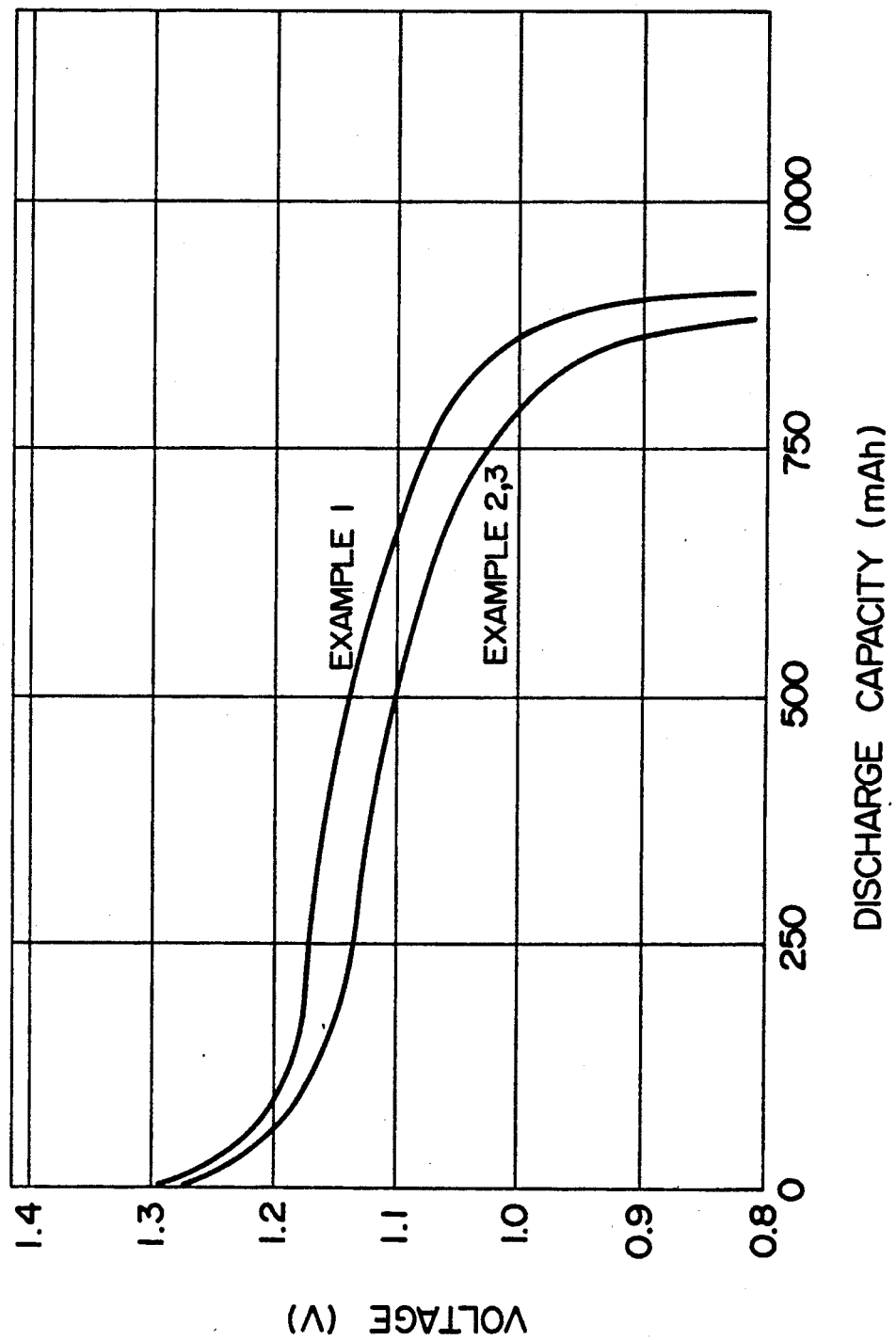
FIG. 3 is a graph view showing the relation between the discharge electric capacity and the battery voltage in the case where as discharging current of 3 CmA at 20° C. is respectively supplied to various hydrogen absorbing alloy negative electrodes different in construction.

FIG. 3 shows discharging curves in the cases where the three kinds of batteries of the respective Examples 1 to 3 were discharged with a discharging current of 3 CmA under the condition of 20° C. In FIG. 3, the battery voltage at an intermediate point of the discharge capacity when the battery has been discharged to 0.8 V is defined as an intermediate voltage for indicating the difference among the discharging voltages of the batteries.

Comparing the examples, the respective discharge capacities of the batteries are not different but the intermediate voltages are remarkably different. In the Example 1, the intermediate voltage was 1.150 V. In each of the Examples 2 and 3, the intermediate voltage was 1,100 V. In short, the difference between the intermediate voltages of the Example 1 and each of the Examples 2 and 3 was 50 mV.

The reason is as follows. In the Example 1, the wetting property of the inside of the negative electrode for the electrolytic solution was improved because hydrophilic resin PVA was added to the inside of the hydrogen absorbing alloy negative electrode. Accordingly, in the Example 1, the effective surface area in the electrochemical reaction increased to reduce the discharging current density as compared with the Examples 2 and 3, so that the discharge intermediate voltage increased.

For the aforementioned reason, in the Example 1 the voltage drop in high-rate discharging could be prevented.

Table 1 shows the internal gas pressure of the battery in the cases where the batteries respectively having the twenty kinds of hydrogen absorbing alloy negative electrodes of the Examples 1 to 20 were charged with a charging current of 1 CmA to 200% of the positive electrode capacity, and the intermediate voltages in the case where the batteries were continuously discharged to 0.8 V with a discharging current of 3 CmA at 20° C.

TABLE 1

|  |  | Internal gas pressure (kg/cm$^2$) | Intermediate Voltage (V) |
|---|---|---|---|
| Example | 1 | 3.3 | 1.150 |
| " | 2 | 4.8 | 1.100 |
| " | 3 | 7.0 | 1.100 |
| " | 4 | 26.4 | 1.126 |
| " | 5 | 3.3 | 1.080 |
| " | 6 | 3.3 | 1.180 |
| " | 7 | 15.4 | 1.148 |
| " | 8 | 5.6 | 1.140 |
| " | 9 | 20.4 | 1.150 |
| " | 10 | 7.0 | 1.153 |
| " | 11 | 8.3 | 1.162 |
| " | 14 | 1.8 | 1.170 |
| " | 15 | 2.4 | 1.162 |
| " | 16 | 2.3 | 1.200 |
| " | 17 | 8.4 | 1.155 |
| " | 18 | 14.3 | 1.125 |
| " | 19 | 11.2 | 1.151 |
| " | 20 | 3.5 | 1.175 |

The particle diameter of the hydrogen absorbing alloy powder in the Examples 4 and 5 was examined as follows. Referring to Table 1, the internal gas pressure of the battery was increased to 25.4 kg/cm$^2$ when the mean particle diameter of the hydrogen absorbing alloy powder was 0.1 μm. The reason is that the surface of the alloy is oxidized more easily as the mean particle diameter of the hydrogen absorbing alloy is reduced, so that the polarization of the hydrogen absorbing alloy negative electrode increases to accelerate generation of a hydrogen gas in charging the battery. On the contrary, when the mean particle diameter of the hydrogen absorbing alloy increases to 75 μm as shown in the Example 5, the area of the electrode surface decreases compared with the Example 1. Accordingly, the intermediate voltage in the Example 5 is reduced by 70 mV compared with the Example 1. It is apparent from the above description that the preferred range of the mean particle diameter of the hydrogen absorbing alloy is from 1 to 50 μm.

In the Example 6, that is to say, in the case where a negative electrode formed by dipping hydrogen absorbing alloy particles into an alkaline solution to roughen the surfaces of the particles was used, the internal gas pressure of the battery in charging the battery was not different from that in the Example 1 but the intermediate voltage in discharging the battery was increased by 30 mV. As the result, it is preferable that the particles of the hydrogen absorbing alloy powder have uneven layers in the surfaces thereof.

In the Examples 7 to 10, the hydrophobic resin added to the surface of the hydrogen absorbing alloy negative electrode was examined as follows. In each of the Example 7 in which polyethylene was disposed on the surface of the negative electrode, the Example 8 in which M-12 having a permeability coefficient of $1 \times 10^{-9}$ cm/sec atm for a hydrogen gas was disposed, the Example 9 in which ND-1 as a FEP dispersion containing a surface active agent in a solution was disposed, and the Example 10 in which VDF was disposed, the internal gas pressure of the battery in charging the battery was increased compared with the Example 1.

This is because the hydrophobic degree of the resin in each of the Examples 7 and 10 was smaller than that of FEP, so that a solid-gas interface for absorption of a hydrogen gas could not be formed sufficiently on the hydrogen absorbing alloy negative electrode.

In the Example 8, the solid-gas interface could be formed sufficiently on the hydrogen absorbing alloy negative electrode. However, the Example 8 was inferior in permeability of the negative electrode for a hydrogen gas generated by the electrochemical erection, so that in the Example 8 the internal gas pressure of the battery was increased. In the case where the hydrogen absorbing alloy negative electrode was coated with a hydrophobic resin having a small permeability coefficient for oxygen gas, the pressure of the battery in charging the battery was increased due to a inferiority of permeability of the negative electrode for an oxygen gas. In this case, from analyzing the gas composition, it was found that the proportion of oxygen increased compared with the Example 1. This is because the capacity of reducing an oxygen gas was reduced since the negative electrode was inferior in premeability for an oxygen gas.

In the Example 9, the solid-gas interface could not be formed sufficiently on the hydrogen absorbing alloy negative electrode in the same manner as in the Examples 7 and 10, because the surface active agent existing in the solvent of ND-1 was absorbed on FEP so that the negative electrode had a insufficient capacity of absorbing a hydrogen gas.

From the point of view of the structure of the battery safety vent or from the point of view of the strength of the battery case, it is preferable that the internal gas pressure of the battery in charging the battery is not higher tan 5 kg/cm². Accordingly, the conditions of preferred hydrophobic material to be disposed on the surface layer of the hydrogen absorbing alloy negative electrode is as follows.

(1) The material is selected from fluorine resins;

(2) The permeability coefficient for an oxygen gas or an hydrogen gas is not smaller than $1 \times 10^{-8}$ cm/sec.atm at 25° C.;

(3) When dispersion is used, no surface active agent is contained in the solvent; and (4) The material is selected from the group consisting of poly(ethylene tetrafluoride) resin and ethylene tetrafluoridepropylene hexafluoride copolymer resin.

Figure 4:
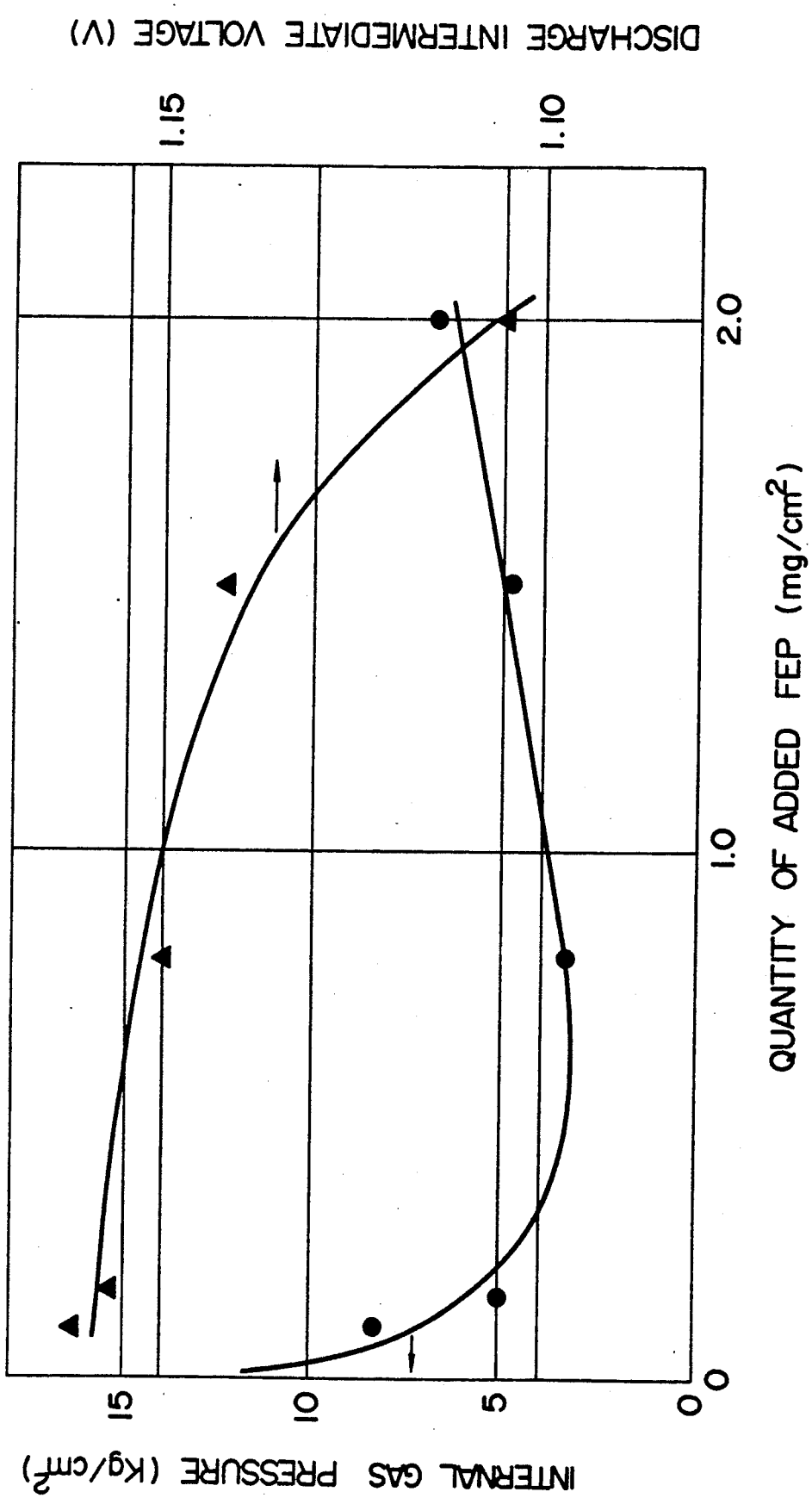
FIG. 4 is a graph view showing the relations among the quantity of FEP to be added, the internal gas pressure in the case where the battery is charged by 200% with respect to the positive electrode capacity with a charging current of 1 CmA at 20° C., and the intermediate voltage in the case where the battery is discharged to 018 V with a discharging current of 3 CmA at 20° C.

In the Examples 11 and 12, the quantity of the hydrophobic resin to be added to the surface layer of the hydrogen absorbing alloy negative electrode was examined as follows. In the Example 11, when the quantity of FEP to be added was 0.1 mg/cm², the internal gas pressure of the battery in charging the battery was increased to 8.3 kg/cm². In the Example 12, when the quantity of FEP to be added was 2 mg/cm², the intermediate voltage in discharging the battery was reduced to 1.105 V because FEP acts as an insulating material to thereby increase the polarization of the hydrogen absorbing alloy negative electrode in discharging the battery. FIG. 4 shows the relations among the quantity of FEP to be added, the internal gasp pressure of the battery in charging the battery and the intermediate voltage in discharging the battery. It is apparent from FIG. 4 that an optimum value exists in the quantity of FEP to be added. Accordingly, from the viewpoint of both the internal gas pressure of the battery in charging the battery and the intermediate voltage in discharging the battery, it is preferable that the hydrophobic resin is added to the surface layer of the hydrogen absorbing alloy negative electrode by an amount in the range of from 0.15 mg/cm² to 1.5 mg/cm².

In the Examples 13 and 14, the effect by addition of a material capable of catalyzing the decomposition of a hydrogen gas, to the surface of the hydrogen absorbing alloy negative electrode and the method of addition thereof were examined. In the Example 13, the battery used a hydrogen absorbing alloy negative electrode coated with a mixture of platinum black capable of catalyzing the decomposition of a hydrogen gas and FEP acting as a hydrophobic material. In the Example 14, the battery used a hydrogen absorbing alloy negative electrode coated with platinum black and then coated with FEP. Referring to Table 1, in any case, the internal gas pressure of the battery in charging the battery was decreased and the intermediate voltage in discharging the battery was increased, compared with the battery of the Example 1 using the hydrogen alloy negative electrode coated with FEP. This is because, by the addition of platinum black, the hydrogen gas absorbing reaction on the hydrogen absorbing alloy electrode as represented by the equation (7) was accelerated in charging the battery and the hydrogen desorbing reaction on the hydrogen absorbing alloy was accelerated in discharging the battery. Although the examples have shown the case where platinum black was used as a material capable of catalyzing the decomposition of a hydrogen gas, the invention, of course, is not limited to the specific examples described herein and the material may be selected from the group of platinum, palladium and palladium black. In fact, the same excellent result could be obtained by using the aforementioned materials.

The effect by arranging the hydrogen absorbing alloy powder having a hydrogen equilibrium pressure lower than that of $MmNi_{3.55}Mn_{0.4}Al_{0.3}Co_{0.75}$, in the surface of the hydrogen absorbing alloy negative electrode was examined with reference to the Example 15. The hydrogen equilibrium pressure of $MmNi_{3.55}Mn_{0.4}Al_{0.3}Co_{0.75}$ is about 0.4 kg/cm$^2$ at 20° C., whereas the hydrogen equilibrium pressure of $LaNi_4Al$, which was disposed in the surface of the negative electrode, is about $1.8 \times 10^{-3}$ kg/cm$^2$ at 20° C. In this example, the internal gas pressure of the battery in charging the battery was 2.4 kg/cm$^2$. The value of the internal gas pressure of the battery was excellent compared with the value of 3.3 kg/cm$^2$ obtained in the Example 1. This is because the hydrogen gas absorbing reaction of the equation (7) is apt to progress since the hydrogen equilibrium pressure of $LaNi_4Al$ is lower than that of $MmNi_{3.55}Mn_{0.4}Al_{0.3}Co_{0.75}$. The effect by $LaNi_4Al$ was obtained both in the case where it was disposed in the surface of the hydrogen absorbing alloy and in the case where it was disposed in the hydrophobic layer of the negative electrode surface. Although this embodiment has shown the case where $LaNi_4Al$ was used as a hydrogen absorbing alloy to be added to the negative electrode surface, it is to be understood that any suitable hydrogen absorbing alloy may be used as long as the hydrogen equilibrium pressure of the alloy is lower tan that of $MmNi_{3.55}Mn_{0.4}Al_{0.3}Co_{0.75}$.

The effect provided by addition of the electric conductive material to the hydrophobic layer of the hydrogen absorbing alloy negative electrode was examined with reference to the Example 16. In the Example 16, the internal gas pressure of the battery in charging the battery was 2.3 kg/cm$^2$ and the intermediate voltage in discharging the battery was 1.200 V. The values thus obtained in the Example 16 were excellent compared with the Example 1. This is because the electrical conductivity of the hydrogen absorbing alloy negative electrode was improved by addition of the electric conductive material to thereby reduce the polarization of the hydrogen absorbing alloy negative electrode both in charging the battery and in discharging the battery. Although the Example 16 has shown the case where acetylene black was used as an electric conductive material, the same effect could be obtained in the case where the electric conductive material was selected from the group of amorphous-structure carbon such as carbon black, ketjen black and the like, or graphite having a graphite structure and the like. Further, when expandable graphite was used, adhesion of FEP to the negative electrode was improved, so that the charge/discharge cycle life performance was improved.

Figure 5:
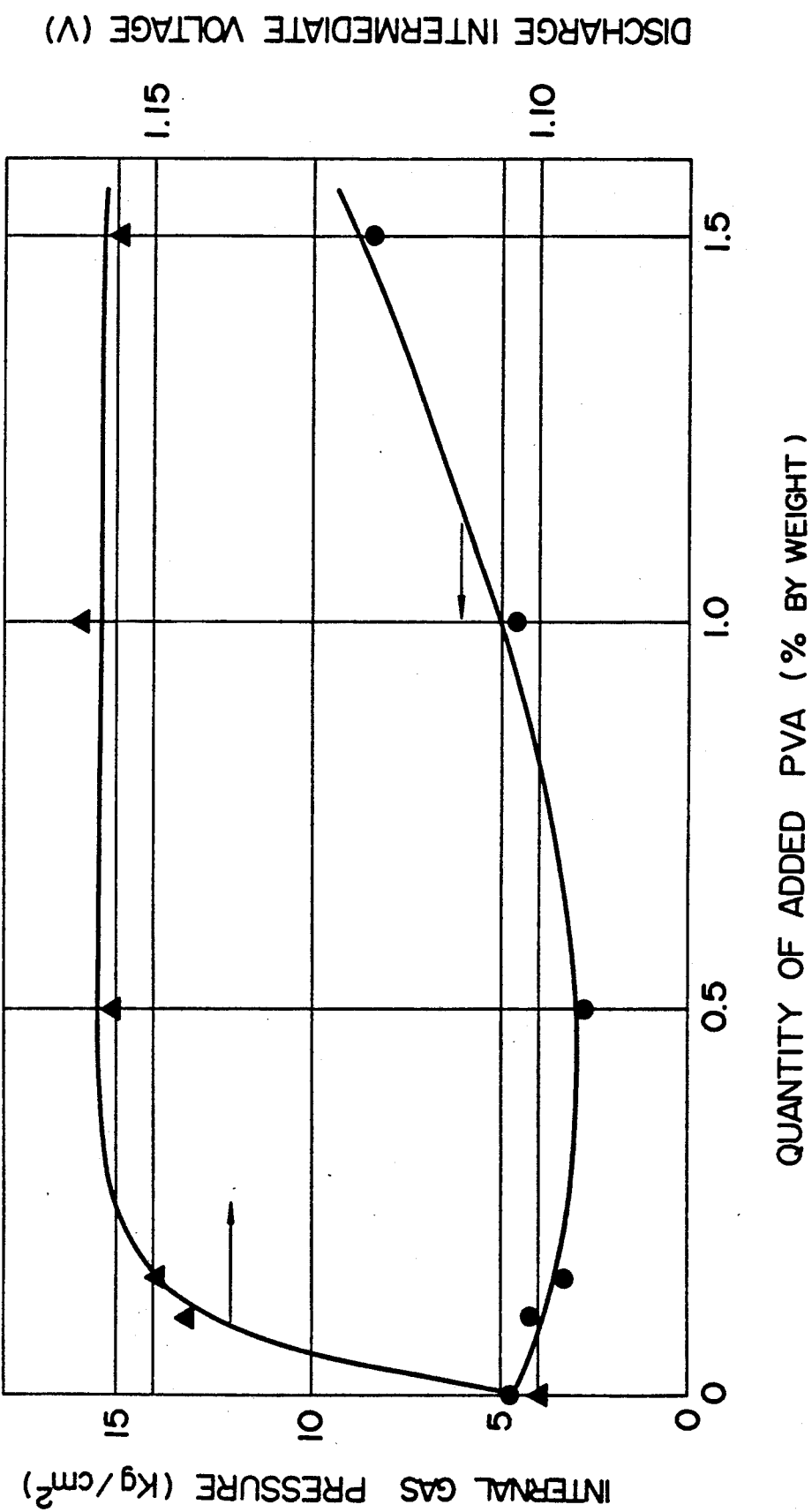
FIG. 5 is a graph view showing the relations among the quantity of PVA to be added, the internal gas pressure in the case where the battery is charged by 200% with respect to the positive electrode capacity with a charging current of 1 CmA at 20° C., and the intermediate voltage in the case where the battery is discharged to 0.8 V with a discharging current of 3 CmA at 20° C.

The quantity of the hydrophilic resin to be contained in the hydrogen absorbing alloy negative electrode was examined as follows. The Example 17 relates to a battery using a hydrogen absorbing alloy negative electrode containing PVA, which is a hydrophilic resin, by an amount ten times the amount in the Example 1. Referring to Table 1, the discharging characteristic was not improved though a large amount of the hydrophilic resin was added, and the internal gas pressure of the battery in charging the battery was increased to 8.4 kg/cm$^2$. In general, the relative quantity of the hydrogen absorbing alloy power is decreased as the quantity of PVA is increased. Accordingly, addition of a large quantity of PVA is not preferable from the point of view of high energy density of the hydrogen absorbing alloy negative electrode. On the contrary, the Example 2, in which no PVA is added, is not preferable from the point of view of charging/discharging characteristics. FIG. 5 shows the relations among the quantity of PVA to be added, the internal gas pressure of the battery in charging the battery and the intermediate voltage in discharging the battery. From the results of FIG. 5 and from the point of view of high energy density of the hydrogen absorbing alloy negative electrode, the optimum quantity of PVA to be added is in the range of from 0.05 to 1.0% by the weight of the hydrogen absorbing alloy. Although the example has shown the case were PVA was used as a hydrophilic material, it is a matter of course that the invention is not limited to the specific example. The same effect could be obtained in the case where the hydrophilic material was selected from other alkali-resisting resins such as carboxymethyl cellulose.

The porosity of the hydrogen absorbing alloy negative electrode was examined as follows. In the Example 18 in which the porosity of the hydrogen absorbing alloy negative electrode was established to be 15 vol. %, the internal gas pressure of the battery in charging the battery was 14.3 kg/cm$^2$. The hydrogen gas absorption capacity of the battery of the Example 18 was reduced compared with that of the battery of the Example 1 in which the porosity of the hydrogen absorbing alloy negative electrode was established to be 30 vol. %. The reason is as follows. The Example 18 was inferior in the wetting property of the inside of the electrode for the electrolytic solution because the porosity of the hydrogen absorbing alloy negative electrode was no more than 15 vol. %. As the result, the electrochemical hydrogen absorbing reaction of the equation (5) was suppressed and the hydrogen gas generation of the equation (7) was accelerated. Further, the intermediate voltage in discharging the battery was reduced compared with the Example, 1 because the wetting property of the electrode was deteriorated. On the contrary, when the porosity of the hydrogen absorbing alloy is increased, the charging/discharging characteristics are improved. However, the increase of the porosity is not preferable from the point of view of high energy density of the hydrogen absorbing alloy negative electrode and battery. Accordingly, the preferred porosity of the hydrogen absorbing alloy negative electrode is in the range of from 20 to 40 vol. %.

The method of addition of the hydrophobic material to the surfaced of the hydrogen absorbing alloy negative electrode was examined as follows. The Example 1 relates to a battery using a negative electrode formed by the steps of: mixing hydrogen absorbing alloy powder and an aqueous solution of PVA to prepare paste; filling a foamed nickel matrix as a three-dimensional supporting matrix with the paste; pressing the supporting matrix containing the paste; and applying FEP to the surface of the negative electrode. The Example 19 relates to a battery using a negative electrode formed by pressing the supporting matrix after applying FEP to the surface of the supporting matrix containing the paste. It was apparent from Table 1 that the internal gas pressure of the battery in charging the battery in the Example 19 was increased to 11.2 kg/cm$^2$ compared with the Example 1. This is because FEP in the Example 19 was distributed into the inside of the hydrogen absorbing alloy negative electrode by pressing the supporting matrix, so that the hydrophilic property of the inside of the hydrogen absorbing alloy negative electrode was deteriorated and the electrochemical hydrogen absorbing reaction of the equation (5) was suppressed to thereby accelerate generation of a hydrogen gas in charging the battery. For the above reason, the preferred method of producing a hydrogen absorbing alloy negative electrode is the method of the Example 1 comprising the steps of: mixing hydrogen absorbing alloy powder and an aqueous solution of PVA to prepare paste; applying the paste to a supporting matrix through selected one of filling, injecting and smearing; pressing the supporting matrix and applying FEP to the surface thereof by selected one of smearing, dipping and injecting. This hydrogen absorbing alloy negative electrode production method can be applied to the case where the surface of the hydrogen absorbing alloy negative electrode contains a material capable of catalyzing the decomposition of a hydrogen gas, an electric conductive material and hydrogen absorbing alloy powder having a hydrogen equilibrium pressure lower than that of $MmNi_{3.55}Mn_{0.4}Al_{0.3}Co_{0.75}$. In this case, it is preferable that the aforementioned materials and mixtures of the materials and FEP are applied to the surface of the hydrogen absorbing alloy negative electrode through selected one of smearing, dipping and injecting after pressing the supporting matrix containing the paste consisting of hydrogen absorbing alloy powder and an aqueous solution of PVA.

The Example 20 relates to a battery using a negative electrode prepared by the steps of: filling a supporting matrix with paste consisting of hydrogen absorbing alloy powder and an aqueous solution of PVA; pressing the supporting matrix to prepare a hydrogen absorbing alloy negative electrode, and adding FEP to the surface of the negative electrode through dipping the negative electrode into a PVA aqueous solution containing FEP. The charging/discharging characteristics of the battery of the Example 20 were as follows. The internal gas pressure of the battery in charging the battery was 3.5 kg/cm$^2$ and the intermediate voltage in discharging the battery was 1.175 V. It is apparent from comparison with the Example 1 that the discharging characteristic of the battery of the Example 20 has been improved. Further, the internal gas pressure of the battery using the negative electrode of the Example 20 was not deteriorated even in the case where charge/discharge was repeated over 500 cycles. This is because FEP is fixed firmly to the surface of the negative electrode by polyvinyl alcohol. As described above, another preferred method of producing a hydrogen absorbing alloy negative electrode according to the invention may comprises the steps of: mixing hydrogen absorbing alloy powder and an aqueous solution of PVA to prepare paste; applying the paste to a supporting matrix through selected one of filling, dipping and injecting; pressing the supporting matrix; and applying a mixture of a hydrophilic material and a hydrophobic material to the surface of the negative electrode through selected one of smearing, dipping and injecting.

It is to be understood that polyvinyl alcohol may be replaced by one of other alkali-resisting resins such as carboxymethylcellulose and methylcellulose and the same effect can be obtained by the other alkali-resisting resins.

A further battery was prepared as follows. A mixture of FEP and polyethylene at a weight ratio of 2:1 was applied to the surface of the hydrogen absorbing alloy negative electrode by an amount of FEP of 0.8 mg/cm$^2$. Then the negative electrode was heated at 120° C. for 30 minutes. The battery was prepared by using the thus prepared negative electrode. The internal gas pressure of the battery in charging the battery was 3.5 kg/cm$^2$ and the intermediate voltage thereof in discharging the battery was 1,150 V. Those obtained values were substantially the same as those in the Example 1. However, the internal gas pressure of the battery was not deteriorated in the same manner as in the Example 20 even in the case where charge/discharge was repeated over 500 cycles. This is because FEP was fixed firmly to the surface of the negative electrode by polyethylene. Polyethylene used herein may be replaced by one of thermoplastic resins, such as polypropylene, polyvinyl chloride, ABS resin and polystyrene, having a melting point lower than that of FEP. In the case where polyethylene was replaced by one of the aforementioned thermoplastic resins, the same effect as described above was obtained. As described above, a further preferred method of producing a hydrogen absorbing alloy negative electrode according to the invention may comprise the steps of: mixing hydrogen absorbing alloy powder and an aqueous solution of PVA to prepare paste; applying the paste to a supporting matrix through selected one of filling, dipping and injecting; pressing the supporting matrix; applying a mixture of a hydrophobic material and a thermoplastic resin having a melting point lower tan that of the hydrophobic material to the surface of the negative electrode through selected one of smearing, dipping and injecting; and heating the negative electrode at a temperature at which the thermoplastic resin is melted but the hydrophobic material is not melted.

The effect by adding a material capable of catlyzing the decomposition of oxygen gas and hydrogen gas, to the battery was examined with reference to the Examples 21 and 22.

EXAMPLE 21

A pellet prepared by pressing the sintered porous aluminum powder, which diameter and length were about 1 mm and 2.5 mm respectively, was dipped into a palladium chloride aqueous solution to deposit a palladium, by an amount of 25 mg, on the pellet. After that, the pellet was dried and dipped into a dispersion solution of a fluorine resin, by an amount of 1.5 wt. %, to have a hydrophobic nature. The pellet was wrapped by the polypropylene nonwoven fabric and inserted into a battery case, which was insulated to the positive electrode and negative electrode, to constitute a sealed nickel hydrogen storage battery.

In the case of the Example 21, the internal gas pressure of the battery in charging to 200% of the positive electrode capacity with a charging current of 1 CmA was 2.8 kg/cm$^2$ and the intermediate voltage was 1.150 V which is the same as that of Example 1.

EXAMPLE 22

An aluminum pellet was dipped into a chloroplatinic acid solution to deposit a platinum, by an amount of 25 mg, on the pellet. After that, the pellet was dried and treated a hydrophobic treatment which was the same as Example 21. The pellet was wrapped by the polypropylene nonwoven fabric and inserted into a battery case, which was insulated to the positive and negative electrodes, to constitute a sealed nickel hydrogen storage battery.

In the case of the Example 22, the characteristics of the battery was the same as Example 21.

Although this embodiment has shown the case where the aluminum pellet was used as a catalysis support material, it is to be understood that carbon pellet may be used. Further it is to be understood that palladium or platinum capable of catalyzing the decomposition of oxygen gas and hydrogen gas may be replaced by gold or silver.

With respect to the Examples 1 to 22, substantially the same results were obtained even in the case where the composition of the hydrogen absorbing alloy was changed within the range represented by the general formula $A_{1-x}B_xC_y$. However, when MmNi$_5$ was used as a hydrogen absorbing alloy having a CaCu$_5$-type crystal structure, pulverization of hydrogen absorbing alloy particles progressed by repeating the charge/discharge cycles, so that the particles were sheded out of the electrode supporting matrix and the discharge capacity was reduced to deteriorate the cycle life performance of the battery. To solve the problem, at least one metal selected from the group consisting of Ti, Zr, Ca, Y, Hf, Co, Mn, Al, Fe, Cu and Cr was added to MmNi$_5$ to prepare a multicomponent alloy. The progress of pulverization of hydrogen absorbing alloy particles by repeating the charge/discharge cycles was suppressed by the multicomponent alloy, so that the cycle life performance characteristic of the battery was improved. However, when Ti, Zr, Ca, Y or Hf was added by an amount of not smaller than 0.2 atomic ratio, when Co or Cu was added by an amount of not smaller than 1.0 atomic ratio, when Fe or Cr was added by an amount of not smaller than 0.3 atomic ratio, when Mn was added by an amount of not smaller than 0.6 atomic ratio or when Al was added by an amount of not smaller than 0.5 atomic ratio, the alloy phase effective for absorbing hydrogen was reduced so that the discharge capacity was undesirably reduced. On the contrary, when Ni was added by an amount of not larger than 3.5 atomic ratio, the discharge capacity of the hydrogen absorbing alloy negative electrode was deteriorated in the same manner as described above. On the other hand, when the weight ratio of the hydrogen absorbing alloy was widely changed from CaCu$_5$ to CaCu$_{4.7}$ or CaCu$_{5.3}$, the discharge capacity of the hydrogen absorbing alloy negative electrode was undesirably deteriorated in the same manner as described above. As described above, the preferred hydrogen absorbing alloy used in the hydrogen absorbing alloy negative electrode is represented by the general composition formula $A_{1-x}B_xC_y$, in which A is selected from the group consisting of La, mixtures of La and rare-earth elements, and misch metal; B is selected from the group consisting of Ti, Zr, Ca, Y, Hf and mixtures thereof; x has a value within the range $0 \leq x \leq 0.2$; C is selected from the group consisting of Ni, Co, Mn, Al, Fe, Cu, Cr and mixtures thereof; and y has a value within the range of $4.7 \leq y \leq 5.3$, made up as follows, $y \leq 3.5$ for Ni, $y \leq 1.0$ for Co, $Y \leq 0.6$ for Mn, $y \leq 0.5$ for Al, $y \leq 0.3$ for Fe, $y \leq 1.0$ for Cu, and $y \leq 0.3$ for Cr.

Further, V was added to the aforementioned hydrogen absorbing alloy to prepare a hydrogen absorbing alloy represented by the formula MmNi$_{3.55}$Co$_{0.75}$Mn$_{0.4}$Al$_{0.3}$V$_{0.2}$. When the negative electrode of the battery was formed of the alloy, the internal gas pressure of the battery in charging the battery was 2.8 kg/cm$^2$ and the intermediate voltage in discharging the battery was 1.158 V. Thus, the battery was improved compared with the Example 1. This is because the lattice constant of the hydrogen absorbing alloy was increased by addition of V thereby hydrogen can diffuse rapidly in the hydrogen absorbing alloy phase. The effect by addition of V was found when V was added by an amount of larger than 0.02 atomic ratio. However, when V was added by an amount of not smaller than 0.3, the alloy phase effective for absorbing hydrogen was reduced so that the discharge capacity was undesirably reduced. Accordingly, it is premerable to add V by an amount in the range of from 0.02 to 0.3 atomic ratio.

Further, In was added to the aforementioned hydrogen absorbing alloy to prepare a hydrogen absorbing alloy represented by the formula MmNi$_{3.55}$Co$_{0.75}$Mn$_{0.4}$Al$_{0.3}$In$_{0.02}$. When a battery was prepared by using the alloy in the negative electrode thereof, the internal gas pressure of the battery in charging the battery was 2.5 kg/cm$^2$. In short, the charging characteristic of the battery was improved compared with the Example 1. This is because the hydrogen over voltage of the hydrogen absorbing alloy negative electrode in charging the battery was increased to suppress generation of hydrogen. The effect by addition of In was found when In was added by an amount of larger than 0.02 atomic ratio. However, when In was added by an amount of not smaller tan 0.1, the discharge capacity was undesirably reduced Accordingly, it is preferable to add In by an amount in the range of from 0.02 to 0.1 atomic ratio. The same effect was obtained in the case where In was replaced by Tl or Ga.

Having described the case where the invention is applied to a nickel-hydrogen storage battery, it is clear that the invention is applicable to other alkaline storage batteries, such as a manganese dioxide-hydrogen storage battery, using a hydrogen absorbing alloy negative electrode.

As described above, according to the present invention, a hydrogen absorbing alloy negative electrode containing a hydrophilic resin in the inside thereof and a hydrophobic resin or hydrophobic material in the surface thereof, which hydrophobic material has powder of a hydrogen absorbing alloy having a hydrogen equilibrium pressure lower than that of the main hydrogen occlusion alloy, an electric conductive material and a material capable of catalyzing the decomposition of hydrogen gas, is provided by the steps of: mixing hydrogen absorbing alloy powder and a hydrophilic material to prepare a paste; applying the paste to a supporting matrix through a selected one of filling, injecting and smearing; pressing the supporting matrix; and applying a material containing a hydrophobic resin to the surface of the negative electrode by selected one of smearing, dipping and injecting. Accordingly, the invention provides a sealed alkaline storage battery free from the increase of the internal gas pressure in overcharging of the battery and free from the decrease of the battery voltage in discharging the battery.

We claim:

1. An alkaline storage battery comprising: a positive electrode containing a metal oxide as a main constituent material thereof; a negative electrode containing, as a main constituent material thereof, a hydrogen absorbing alloy capable of electrochemically absorbing/desorbing hydrogen acting as an active material; an alkaline electrolytic solution; a separator; and said negative electrode including a hydrophobic material disposed in at least a part of an electrode surface layer thereof and including a hydrophilic material disposed in the inside thereof, in which said hydrogen absorbing alloy of said negative electrode is represented by the general composition formula $A_{1-x}B_xC_y$, in which A is selected from the group consisting of La, mixtures of La and rare-earth elements, and misch metal; B is selected from the group consisting of Ti, Zr, Ca, Y, Hf and mixtures thereof; x has a value within the range of $0 \leq x \leq 0.2$; C is selected from the group consisting of Ni, Co, Mn, Al, Fe, Cu, Cr and mixtures thereof; and y has a value within the range $4.7 \leq y \leq 5.3$, made up as follows, $y > 3.5$ for Ni, $y \leq 1.0$ for Co, $y \leq 0.6$ for Mn, $y \leq 0.5$ for Al, $y \leq 0.3$ for Fe, $y \leq 1.0$ for Cu, and $y \leq 0.3$ for Cr.

2. An alkaline storage battery comprising: a positive electrode containing a metal oxide as a main constituent material thereof; a negative electrode containing, as a main constituent material thereof, a hydrogen absorbing alloy capable of electrochemically absorbing/desorbing hydrogen acting as an active material; an alkaline electrolytic solution; a separator; and said negative electrode including a hydrophobic material disposed in at least a part of an electrode surface layer thereof and including a hydrophilic material disposed in the inside thereof, in which said hydrogen absorbing alloy of said negative electrode is represented by the general composition formula $A_{1-x}B_xC_yD_z$, in which A is selected from the group consisting of La, mixtures of La and rare-earth elements, and misch metal; B is selected from the group consisting of Ti, Zr, Ca, Y, Hf and mixtures thereof; x has a value within the range of $0 \leq x \leq 0.2$; C is selected from the group consisting of Ni, Co, Mn, Al, Fe, Cu, Cr and mixtures thereof; y has a value within a range made up as follows, $y > 3.5$ for Ni, $y \leq 1.0$ for Co, $y \leq 0.6$ for Mn, $y \leq 0.5$ for Al, $y \leq 0.3$ for Fe, $y \leq 1.0$ for Cu, and $y \leq 0.3$ for Cr; D is selected from the group consisting of V, In, Tl, Ga and mixtures thereof; z has a value within a range made up as follows, $0.02 \leq z \leq 0.3$ for V, $0.02 \leq z \leq 0.1$ for In, $0.02 \leq z \leq 0.1$ for Tl, and $0.02 \leq z \leq 0.1$ for Ga; and $y+z$ has a value within the range $4.7 \leq y+z \leq 5.3$.

* * * * *